United States Patent
Tanaka et al.

(10) Patent No.: US 6,686,985 B1
(45) Date of Patent: Feb. 3, 2004

(54) WIRING PATTERN OF LIQUID CRYSTAL DISPLAY, LIQUID CRYSTAL DISPLAY, AND ELECTRONIC EQUIPMENT

(75) Inventors: Chihiro Tanaka, Suwa (JP); Tadashi Tsuyuki, Suwa (JP); Mutsumi Matsuo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 537 days.

(21) Appl. No.: 09/631,932

(22) Filed: Aug. 3, 2000

(30) Foreign Application Priority Data

Aug. 5, 1999 (JP) .......................................... 11-222456

(51) Int. Cl.[7] ................................................ G02F 1/13
(52) U.S. Cl. ......................................... 349/143; 349/43
(58) Field of Search .............................. 349/109, 145, 349/143, 43

(56) References Cited

U.S. PATENT DOCUMENTS

| | | | | |
|---|---|---|---|---|
| 4,834,507 A | * | 5/1989 | Kato et al. ................... | 349/145 |
| 5,150,240 A | * | 9/1992 | Kim ............................. | 349/43 |
| 5,353,138 A | * | 10/1994 | Van Winsum ............... | 349/41 |
| 5,822,026 A | * | 10/1998 | Matsuo ........................ | 349/38 |
| 6,100,955 A | * | 8/2000 | Yanagawa et al. .......... | 349/141 |

* cited by examiner

*Primary Examiner*—James Dudek
(74) *Attorney, Agent, or Firm*—Oliff & Berridge, PLC

(57) ABSTRACT

Pixel electrodes corresponding to RGB colors are shifted by half a pitch in the row direction and are arranged in an RGB delta arrangement. One line of data lines is shared by the pixel electrodes corresponding to the same color in the row direction. The data line is formed so as to encircle four sides of each of the pixel electrodes. Accordingly, the parasitic capacitances of the pixel electrodes are made uniform in each pixel.

6 Claims, 11 Drawing Sheets

RGB STRIPE ARRANGEMENT

RGGB MOSAIC ARRANGEMENT

RGB MOSAIC ARRANGEMENT

RGB DELTA ARRANGEMENT

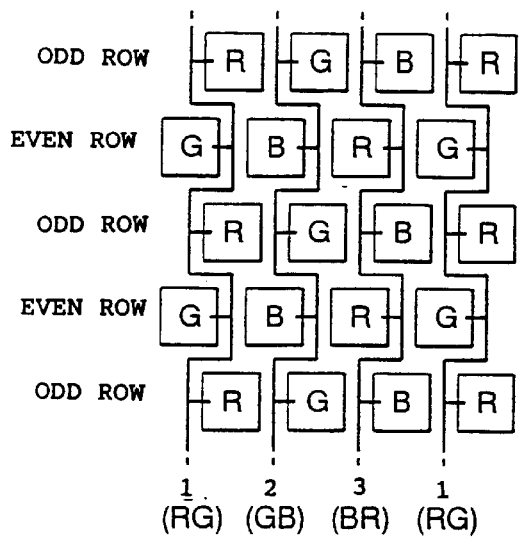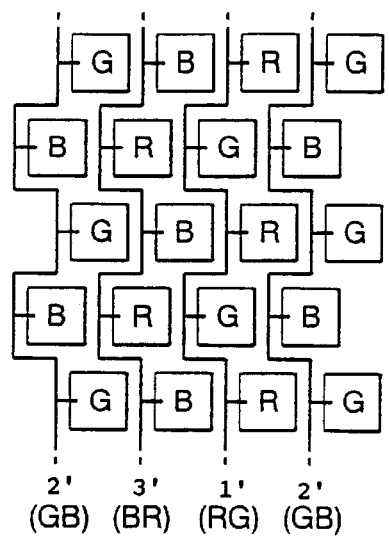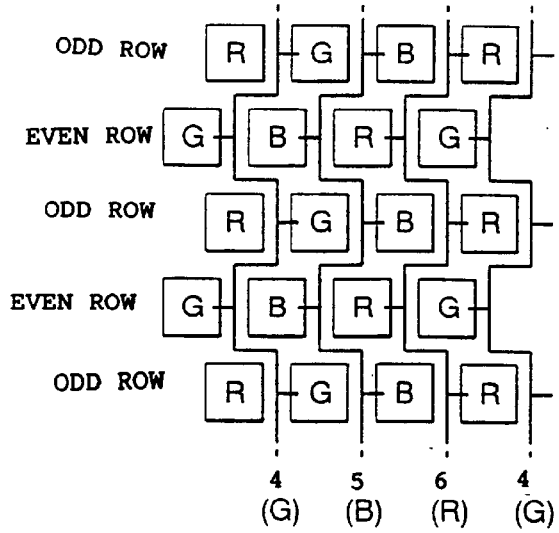

WIRING PATTERN OF LIQUID CRYSTAL DISPLAY, LIQUID CRYSTAL DISPLAY, AND ELECTRONIC EQUIPMENT

BACKGROUND OF THE INVENTION

1. Field of Invention

The present invention relates to a wiring pattern for a liquid crystal display in which unevenness is not noticeable, a liquid crystal display, and an electronic equipment using the liquid crystal display.

2. Description of Related Art

In general, a color liquid crystal display in an active matrix system includes a plurality of pixel electrodes, a device substrate on which these pixel electrodes are provided with nonlinear (switching) devices, an opposing substrate on which counter electrodes opposed to the pixel electrodes and color filters are formed, and liquid crystal filled between the two substrates. Each pixel corresponds to one of three primary colors, R (red), G (green), and B (blue).

With this arrangement, when a selection signal is applied to scanning lines, the switching devices enter a conducting state. When a data signal is applied to data lines in the conducting state, a predetermined charge is accumulated in liquid crystal layers including the pixel electrodes, the counter electrodes, and the liquid crystal between the pixel electrodes and the counter electrodes. When the switching devices enter an off state after the charge has been accumulated, the accumulated charge in the liquid crystal layers is maintained if the resistance of the liquid crystal layers is sufficiently high. Accordingly, when the switching devices are driven so as to control the amount of charge to be accumulated, alignment of the liquid crystal varies according to each pixel, thus displaying predetermined information. It is only necessary to accumulate charge in each liquid crystal layer for a partial period. Therefore, time-division multiplexing driving in which the pixels share the scanning lines and the data lines is made possible by selecting the scanning lines using time-sharing.

Concerning the nonlinear devices, they are broadly classified into a three-terminal nonlinear device, such as a thin-film transistor (TFT), and a two-terminal nonlinear device, such as a thin-film diode (TFD). The latter, that is the two-terminal nonlinear device, is advantageous in that short circuit failure does not occur in theory since there are no intersections in the wiring and that a film deposition process and a photolithography process are shortened. If the two-terminal nonlinear device is to be employed as the nonlinear device, the two-terminal nonlinear device can be connected to either one of the scanning line and the data line. Here, it is assumed that the two-terminal nonlinear device is connected to the data line.

In contrast, concerning arrangements of the color filters in the liquid crystal display, those shown in FIGS. 10(a) to (d) are known. Of these arrangements, the arrangement shown in FIG. 10(a) is referred to as an RGB stripe arrangement or a trio arrangement, and is suitable for a computer display for displaying characters and straight lines. In comparison with the arrangements shown in FIGS. 10(b) to (d), the effective resolution of the arrangement shown in FIG. 10(a) is not so high.

The next arrangement shown in FIG. 10(b) is referred to as an RGGB mosaic arrangement. Since this arrangement has a greater number of G pixels having a high visibility factor, it is generally said that this arrangement has high resolution. However, the arrangement is not necessarily evaluated highly by subjective evaluation experiments. Furthermore, the RGGB mosaic arrangement has a fewer number of B and R pixels. Thus, this arrangement has a drawback in that roughness of an image is noticeable when the viewing distance is short.

The arrangement shown in FIG. 10(c) is referred to as an RGB mosaic arrangement. In this arrangement, a difference in display quality occurs between a rightward-rising diagonal and a leftward-rising diagonal. This generates diagonal noise in an overall image, and, in particular, the noise is noticeable when the number of pixels of a screen is small.

The arrangement shown in FIG. 10(d) is referred to as an RGB delta arrangement, and has a horizontal resolution that is 1.5 times that of the mosaic arrangement. It is said that the RGB delta arrangement is disadvantageous in displaying the contour of an image. Generally, however, the RGB delta arrangement is evaluated highly by subjective evaluation experiments. It is thus suitable for achieving a high definition color liquid crystal display. Hereinafter, drawbacks involved in employing the RGB delta arrangement are discussed.

When the color filters are arranged in the RBG delta arrangement, a wiring pattern of connecting lines (one of the data lines and the scanning lines, and hereinafter simply referred to as lines) to be connected to the pixel electrodes that will be the base of these pixels is discussed below. Concerning the wiring pattern, there is a system in which two of the three RGB colors share a single line, as shown in FIGS. 11(a) and (b). Specifically, line 1 (1') is shared by R and G, line 2 (2') is shared by G and B, and line 3 (3') is shared by B and R. This system has a drawback in that unevenness occurs when displaying solid patterns of C (cyan), M (magenta), and Y (yellow) that are in a complementary-color relation with the RGB colors, that is, when displaying a relatively large area in a single color.

SUMMARY OF THE INVENTION

Regarding the principle of this development of unevenness, the case of displaying cyan is discussed. In this case, a liquid crystal display in a normally white mode displays white (off) in a no-applied-voltage state. When displaying cyan, the R pixels must be black (on) and the G and B pixels must be white. Thus, it is only necessary to write to the R pixels. Because the G pixels on even rows are connected to line 1 (1'), potentials of these G pixels tend towards potentials when writing to the R pixels. In contrast, the G pixels on odd rows are connected to line 2 (2'), and potentials of these G pixels are substantially independent of the potentials when writing to the R pixels. Similarly, because the B pixels on odd rows are connected to line 3 (3'), potentials of these B pixels tend towards the potentials when writing to the R pixels. In contrast, the B pixels on even rows are connected to line 2 (2'), and potentials of these B pixels are substantially independent of the potentials when writing to the R pixels.

As a result, an effective voltage value applied to the G pixels on the even rows and an effective voltage value applied to the G pixels on the odd rows are different from each other. In addition, an effective voltage value applied to the B pixels on the odd rows and an effective voltage value applied to the B pixels on the even rows are different from each other. Accordingly, a difference in gray level occurs every other row. The same drawback occurs when displaying magenta and yellow, and a difference in gray level occurs between odd rows and even rows.

In other words, the difference in gray level becomes uneven in the column direction. Specifically, the B and G pixels which are influenced by writing to the R pixels are alternately shifted by half a pitch of the pixels, and are connected in the column direction. In contrast, the B and G pixels which are not influenced by writing to the R pixels are alternately shifted by half a pitch in a similar manner, and are connected in the column direction. This generates a difference in gray level between the cyan in the column direction of the former pixels and the cyan in the column direction of the latter pixels. Hence, unevenness in the column direction is caused.

In order to prevent such unevenness from occurring, it is necessary to obtain a wiring pattern in which potentials when writing to pixels of a certain color do not influence the potentials of pixels of other colors. To this end, as shown in FIG. 12, it is possible to propose a system in which a single line is shared by only a single color. Specifically, line 4 is shared by G, line 5 is shared by B, and line 6 is shared by R.

With this wiring pattern, there is a problem in that unevenness occurs when displaying solid color patterns in cyan, magenta, and yellow due to a reason that is different from the above-described reason. The principle of this development of unevenness is discussed below. Concerning the wiring pattern, the G pixels on the odd lines are encircled by a "U" shape by line 5 for writing to the B pixels. In contrast, concerning the G pixels on the even rows, they are similarly encircled by a "U" shape by line 6 for writing to the R pixels. Specifically, concerning the G pixels, there are two types: one capacitively coupled to line 5 and the other capacitively coupled to line 6. Similarly, concerning the B pixels, there are two types one capacitively coupled to line 4 and the other capacitively coupled to line 6.

As in the above-described case, when displaying, for example, cyan in the normally white mode, the R pixels must be black and the G and B pixels must be white. Hence, it is only necessary to write to the R pixels. If a write voltage is applied to line 6 so as to write to the R pixels, the gray level in the G pixels on the even rows and the B pixels on the odd rows varies since they are capacitively coupled to line 6. In contrast, concerning the G pixels on the odd rows and the B pixels on the even rows, the gray level does not vary since they are substantially independent of the potential of line 6. This results in a difference between the gray level in the G pixels on the even rows and the B pixels on the odd rows and the gray level of the G pixels on the odd rows and the B pixels on the even rows, thus causing unevenness. The same drawback occurs when displaying magenta and yellow.

In view of the above circumstances, it is an object of the present invention to at least provide a wiring pattern of a liquid crystal display in which unevenness is prevented from becoming noticeable as much as possible, thereby improving the quality of a display image, to provide a liquid crystal display, and to provide an electronic equipment using the liquid crystal display.

To this end, according to a first exemplary embodiment of this invention, a wiring pattern for a liquid crystal display is arranged by shifting pixel electrodes corresponding to pixels displaying different colors by substantially half a pitch for every row. Conduction lines shared by the pixel electrodes in the column direction are connected to the pixel electrodes corresponding to the same color. Parasitic capacitances of the pixel electrodes are made uniform in each pixel.

In order to make the parasitic capacitances of the pixel electrodes uniform in each pixel, the periphery of each pixel electrode may be encircled by the conduction line connected to each pixel electrode. Alternatively, the periphery, apart from a side opposed to the adjacent conduction line, of each pixel electrode may be encircled by the conduction line connected to each pixel electrode. With these arrangements, pixels on even rows and pixels on odd rows are such that a write potential to pixels of a certain color does not influence a potential of pixels of another color. In addition, the gray level of pixels does not vary every row. Hence, it is possible to display an image of high quality.

According to a second exemplary embodiment of this invention, a liquid crystal display includes pixel electrodes corresponding to pixels displaying different colors. The pixel electrodes are provided corresponding to intersections of scanning lines arranged in the row direction and data lines arranged in the column direction. The pixel electrodes are shifted by substantially half a pitch for every row and are thus arranged. Conduction lines shared by the pixel electrodes in the column direction are connected to the pixel electrodes corresponding to the same color. Parasitic capacitances of the pixel electrodes are made uniform in each pixel. Since the liquid crystal display with this arrangement uses the above-described wiring pattern, it is possible to display an image of high quality.

According to the second exemplary embodiment of this invention, it is preferable that the data lines be connected to the pixel electrodes through switching devices. The switching devices may be thin-film diode devices including conductor/insulator/conductor. Accordingly, it is possible to obtain a uniform display image even when the thin-film diode devices in which it is difficult to form storage capacitances in parallel with the pixel electrodes are employed.

According to a third exemplary embodiment of this invention, an electronic equipment includes a liquid crystal display having pixel electrodes corresponding to pixels displaying different colors. The pixel electrodes are provided corresponding to intersections of a plurality of scanning lines arranged in the row direction and a plurality of data lines arranged in the column direction. The pixel electrodes are shifted by substantially half a pitch for every row and are thus arranged. Conduction lines shared by the pixel electrodes are connected to the pixel electrodes corresponding to the same color. Parasitic capacitances of the pixel electrodes are made uniform in each pixel. Concerning such an electronic equipment, there is an information terminal unit, such as a notebook-size personal computer, a pager, or a cellular phone.

BRIEF DESCRIPTION OF THE DRAWINGS

FIGS. 11(a) and (b) are illustrations of wiring patterns for routing lines to pixels in an RGB delta arrangement.

FIG. 12 is an illustration of a wiring pattern for routing lines to pixels in the RGB arrangement.

DETAILED DESCRIPTION OF PREFERRED EMBODIMENTS

The present invention is described hereinafter through the exemplary embodiments with the accompanying drawings.

First Exemplary Embodiment

Figure 1:
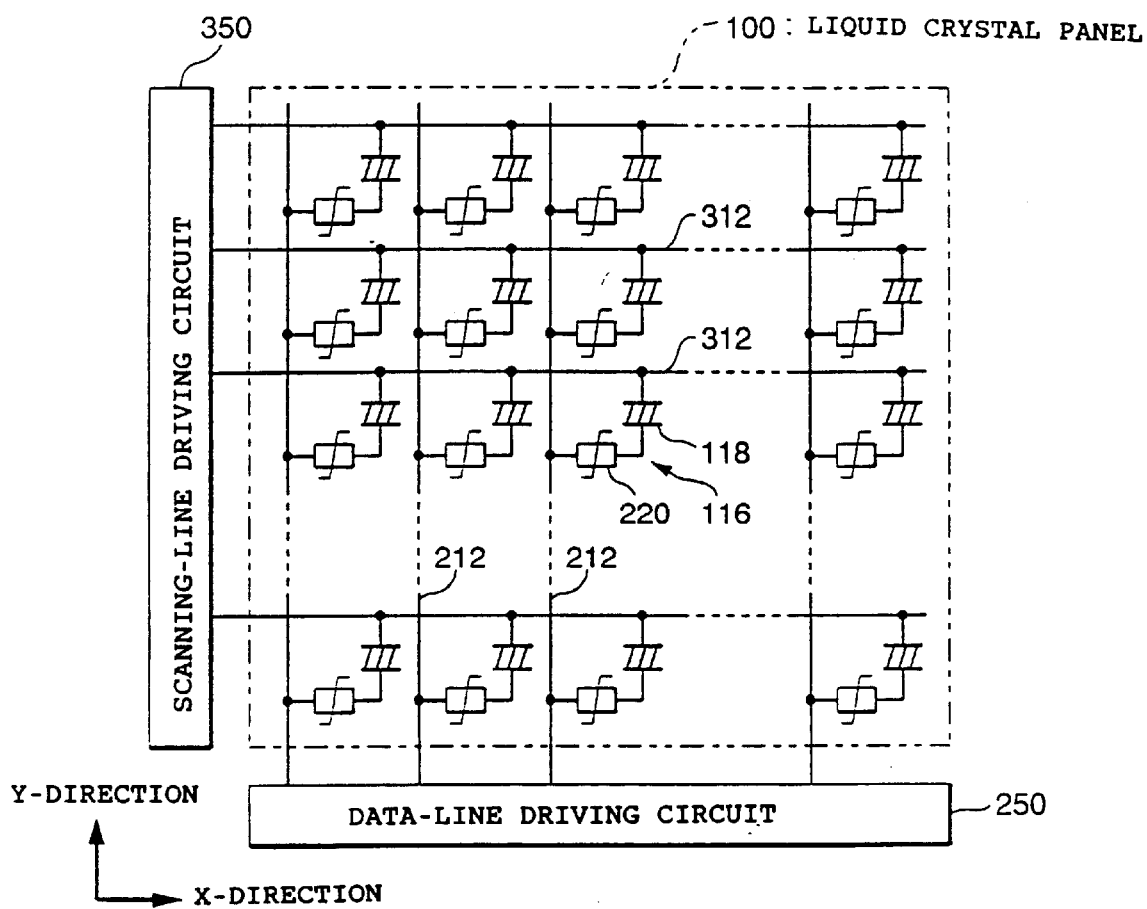
FIG. 1 is a block diagram of the electrical structure of a liquid crystal display according to a first exemplary embodiment of the present invention.

A liquid crystal display according to a first exemplary embodiment of the present invention is described. FIG. 1 is a block diagram of the electrical structure of the liquid crystal display. As shown in the FIG. 1, a liquid crystal panel 100 is provided with a plurality of scanning lines 312 extending in the row (X) direction, a plurality of data lines 212 extending in the column (Y) direction, and pixels 116 formed at intersections of the scanning lines 312 and the data lines 212. The pixels 116 include liquid crystal display elements (liquid crystal layers) 118 and TFD (thin-film diode) devices 220, i.e., two-terminal nonlinear devices, connected in series. The liquid crystal layers 118 are connected to the respective scanning lines 312, and the TFD devices 220 are connected to the respective data lines 212. The scanning lines 312 are driven by a scanning-line driving circuit 350, whereas the data lines 212 are driven by a data-line driving circuit 250.

Figure 2:
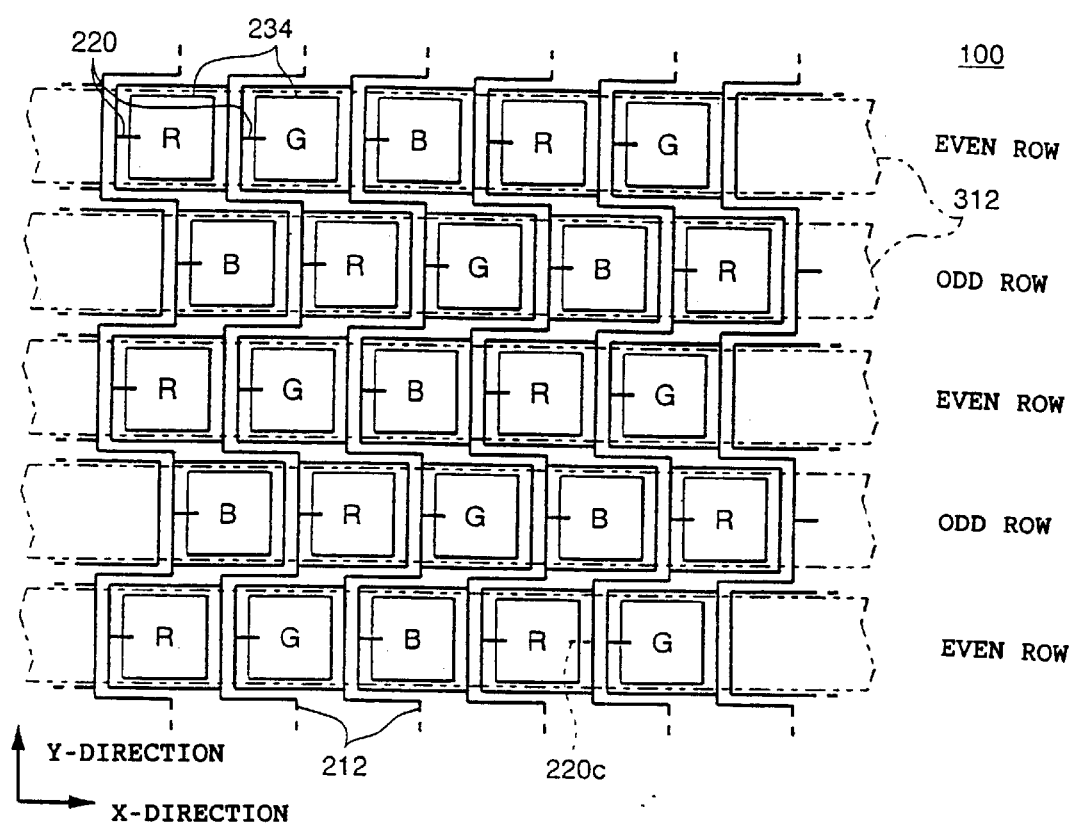
FIG. 2 is a plan view of a wiring pattern in the above embodiment.

The liquid crystal panel 100 is structured such that a device substrate and an opposing substrate are bonded with a predetermined separation, and the separation is filled and sealed with liquid crystal. The planar structure of the liquid crystal panel 100 is described. FIG. 2 is a plan view of the planar structure of the liquid crystal panel 100, and particularly of a wiring pattern of the scanning lines 312 and the data lines 212.

Pixel electrodes 234 and the TFD devices 220, which are indicated by solid lines in the drawing, are formed on the device substrate. The pixel electrodes 234 correspond to the pixels, and are arranged in an RGB delta arrangement. The pixel electrodes 234 are connected through the TFD devices 220 to the data lines 212. In contrast, the scanning lines 312, which are indicated by the broken lines in FIG. 2, are formed on the opposing substrate. The scanning lines 312 operate as electrodes opposed to the pixel electrodes 234. Hence, the liquid crystal layers 118 in FIG. 1 include the pixel electrodes 234, the scanning lines 312 operating as counter electrodes with respect to the pixel electrodes 234, and the liquid crystal held between the two types of electrodes.

Of the regions of the opposing substrate in which the scanning lines 312 are formed, regions opposed to the pixel electrodes 234 are provided with color filters, each corresponding to one of the R, G, and B colors, as shown in FIG. 2. In other regions, mask layers (black matrix) are formed to prevent contrast degradation from occurring due to light leakage. These mask layers are not shown in FIG. 2.

Of the data lines 212 formed on the device substrate, one of the data lines 212 is discussed below. This data line 212 is shared by one of the three colors R, G, and B. This is the same as the wiring pattern shown in FIG. 12. The present embodiment is different in that the periphery of the pixel electrode 234 is encircled by the data line 212 connected to that pixel electrode 234. The pixel electrodes of certain colors are not capacitively coupled to the adjacent data lines 212. Thus, there is no distinction between odd rows and even rows with regard to the pixels corresponding to certain colors.

For example, since G pixels on the odd rows are not capacitively coupled to the adjacent data lines 212 (i.e., the data lines connected to B pixels), the gray level in these pixels is not influenced by variation in the potentials of these data lines 212. Similarly, since the B pixels on the even rows are not capacitively coupled to the adjacent data lines (i.e., the data lines 212 connected to the G pixels), the gray level in these pixels is not influenced by variation in the potentials of these data lines 212.

When writing to R pixels for displaying cyan, there is no difference between the gray level in the G pixels on the even rows and the B pixels on the odd rows and the gray level in the G pixels on the odd rows and the B pixels on the even rows. According to the present embodiment, unevenness described in the related art does not occur. This is the same in displaying magenta and yellow. Since there is no difference in gray level in the pixels on the odd rows and the even rows, unevenness is prevented from occurring.

Since the wiring pattern shown in FIG. 2 is such that four sides of each pixel electrode 234 are encircled by the data line 212, the TFD device 220 can be connected at any portion between the pixel electrodes 234. For example, a TFD device 220c can be provided on the opposite side as shown by a broken line.

Figure 3:
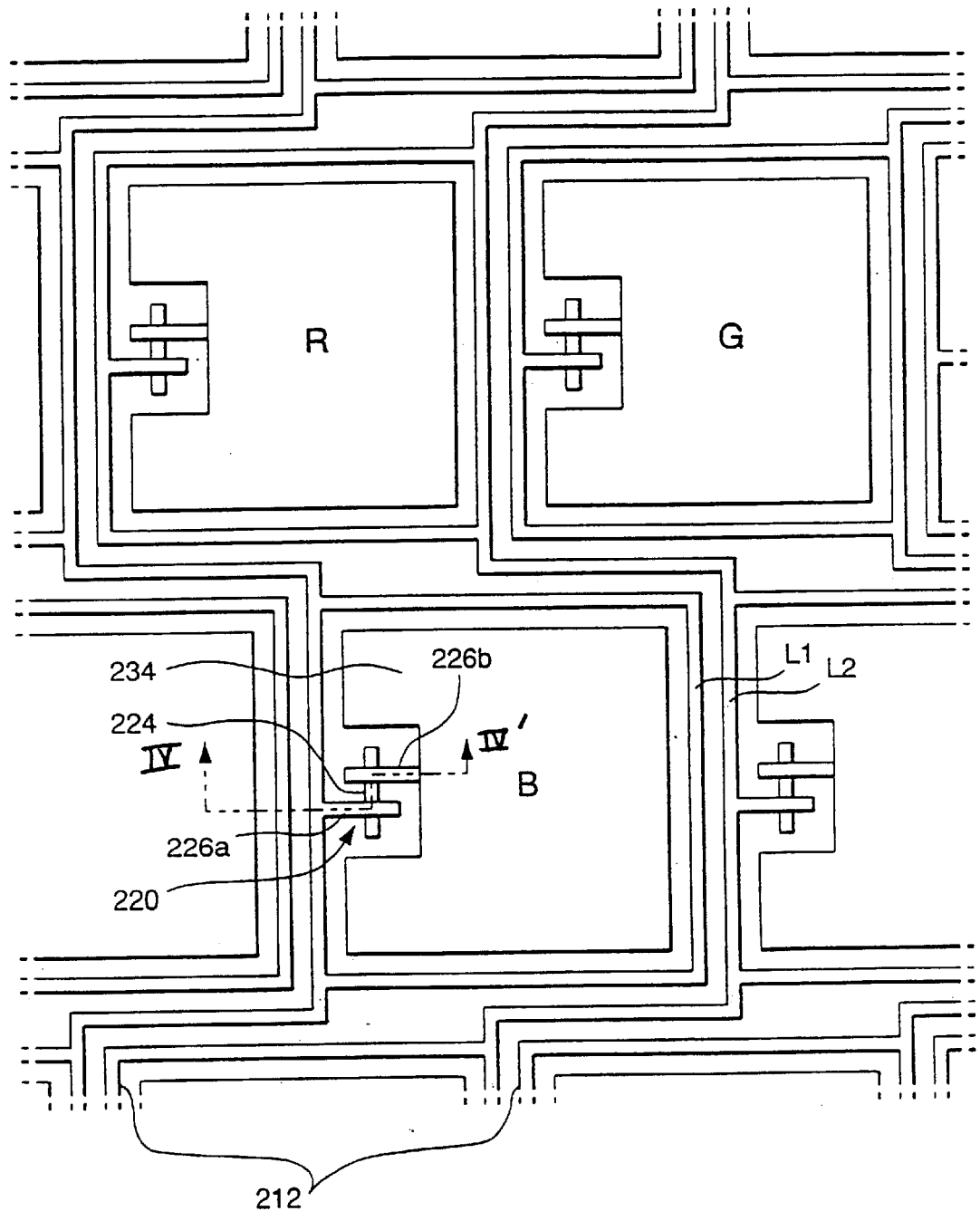
FIG. 3 is a fragmentary plan view of an enlarged portion of the wiring pattern.
Figure 4:
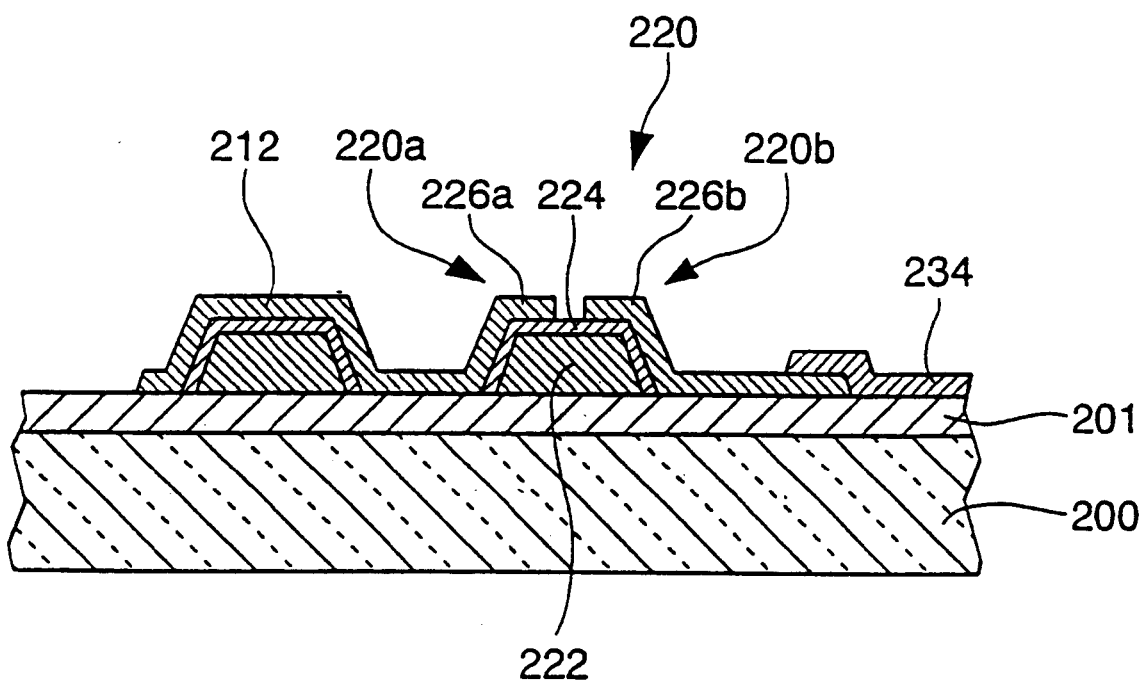
FIG. 4 is a sectional view taken along the line IV–IV' of FIG. 3.

The TFD device 220 for driving each pixel is described in detail. FIG. 3 is a plan view of the layout of a few pixels including the TFD device 220 in the liquid crystal panel 100. FIG. 4 is a sectional view taken along the line IV–IV' of FIG. 3.

In FIGS. 3 and 4, the TFD device 220 includes a first TFD device 220a and a second TFD device 220b. On an insulator film 201 formed on a surface of the device substrate 200, the TFD device 220 includes a first metal film 222, an oxide film 224 that is an insulator formed on the first metal film 222 by anodic oxidation, and second metal films 226a and 226b formed on the oxide film 224 with a separation from each other. The second metal film 226a becomes the data line 212 as it is, whereas the second film metal 226b is connected to the pixel electrode 234.

The first TFD device 220a has a layered structure having a metal (conductor)/insulator/metal (conductor). Specifically, the structure includes, starting from the side of the data line 212, the second metal film 226a/the oxide film 224/the first metal film 222. Hence, the first TFD device 220a has diode switching characteristics in both forward and reverse directions. In contrast, the second TFD device 220b includes, starting from the data line 212, the first metal film 222/the oxide film 224/the second metal film 226b. The second TFD device 220b has opposite diode switching characteristics with respect to those of the first TFD device 220a. Thus, the TFD device 220 is formed by two diodes connected in opposite directions in series. In comparison in the case of using a single diode, current-to-voltage nonlinear characteristics of the TFD device 220 are made symmetric in both forward and reverse directions. If it is not necessary to precisely make the nonlinear characteristics symmetric, only one TFD device can be used.

In contrast, when the pixel electrode 234 connected to the second metal film 226b is used as a transmissive type, it is formed by a transparent metal film, such as ITO (indium tin oxide). If the pixel electrode 234 is used as a reflective type, it is formed by a reflective metal film having a high reflectivity, such as aluminum or silver. Even if the pixel electrode 234 is a reflective type, there is a case in which the pixel electrode 234 is formed by the transparent metal, such as ITO. In this case, the reflective metal as a reflection layer is formed, and subsequently, the pixel electrode 234 formed by the transparent metal is formed via an interlayer insulator film. In contrast, when the pixel electrode 234 is used as a transflective type, the reflection layer is thinly formed so as to be semi-transparent, or a slit is provided.

Regarding the device substrate 200, an insulative material, such as quartz or glass, is used. When the device substrate 200 is used as a transmissive type, it is required to be transparent. When the device substrate 200 is used as a reflective type, it is not required to be transparent. In FIG. 4, the insulator film 201 is formed on the device substrate 200, thus preventing the first metal film 222 from being removed from the substrate by heat treatment and preventing impurities from diffusing in the first metal film 222. If problems as these do not occur, the insulator film 201 can be omitted.

The TFD device 220 is an example of a diode device. Alternatively, a zinc oxide (ZnO) variable resistor or a device using MSI (metal semi-insulator) can be used. It is also possible to use one of these devices or a plurality of these devices connected in opposite directions in series or in parallel.

According to the liquid crystal display of the first exemplary embodiment, four sides of each pixel electrode 234 are encircled by the data line 212 connected to the pixel electrode 234. Each pixel electrode 234 is not influenced by capacitive coupling with the adjacent data line 212. As a result, it is possible to display an image of high quality in which unevenness is prevented from occurring.

Second Exemplary Embodiment

Next, a liquid crystal display according to a second exemplary embodiment of the present invention is described. According to the first exemplary embodiment, the periphery of each pixel electrode 234 is encircled by the data line 212 connected to the pixel electrode 234, and capacitive coupling with the adjacent data line 212 does not cause any problem. Thus, the first exemplary embodiment is advantageous in making a display image uniform. However, as shown in FIG. 3, two data lines 212, i.e., line L1 that is the data line 212 encircling the pixel electrode 234 and line L2 that is the data line 212 adjacent to the pixel electrode 234, are disposed between the two pixel electrodes 234 adjacent to each other in the row direction. Therefore, the possibility of short circuit failure during the patterning process is increased. In addition, there is a problem that an area ratio (aperture ratio) occupied by the pixel electrodes 234 is reduced, thus making the overall screen dark.

Figure 5:
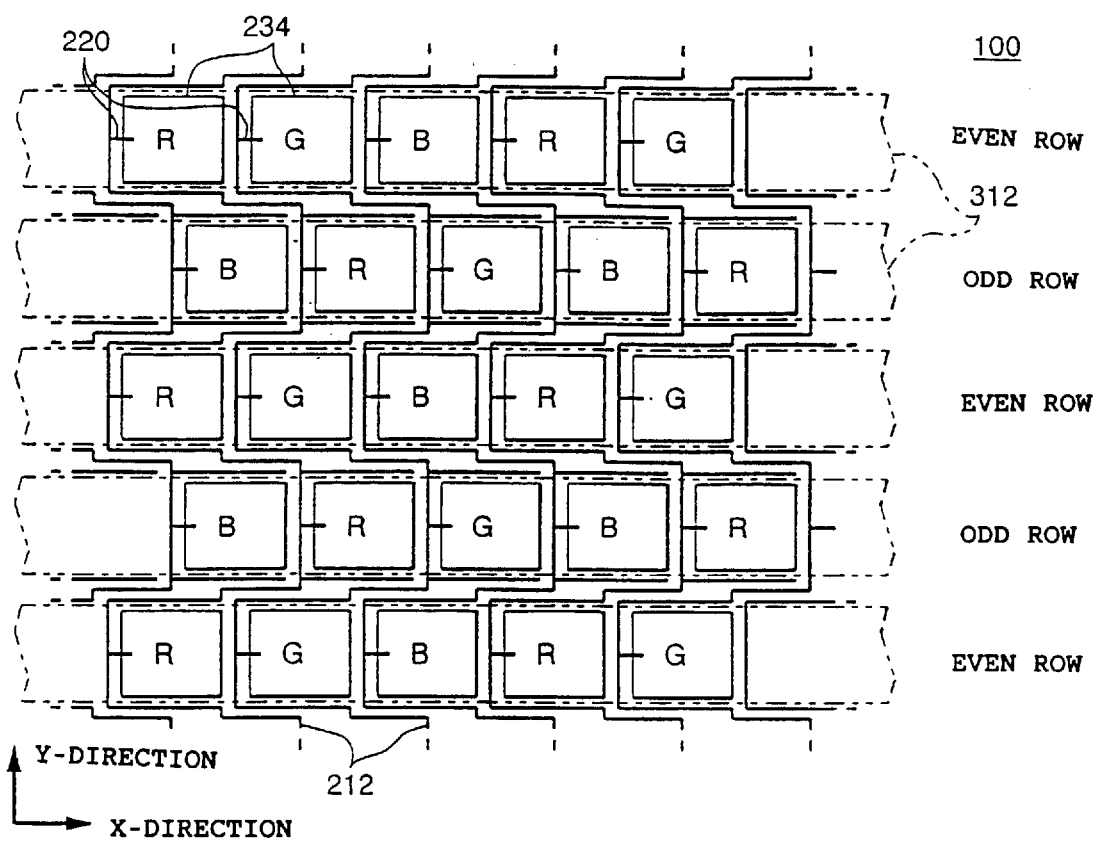
FIG. 5 is a plan view of a wiring pattern of a liquid crystal display according to a second exemplary embodiment of the present invention.

Accordingly, the second exemplary embodiment which solves at least the problems of short circuiting and aperture ratio in the first exemplary embodiment is described. First, the second exemplary embodiment sets parasitic capacitances of the pixel electrodes 234 uniform. FIG. 5 is a plan view of the layout of the device substrate in the liquid crystal display. A wiring pattern shown in FIG. 5 is the same as that of the first exemplary embodiment (see FIG. 2) in that the pixel electrodes 234 corresponding to the RGB colors are arranged in the RGB delta arrangement. The second exemplary embodiment is different from the first exemplary embodiment in that four sides of each pixel electrode 234 are not encircled by the data line 212, but only the three sides apart from the side opposed to the adjacent data line 212 are encircled by a "U" shape.

Figure 6:
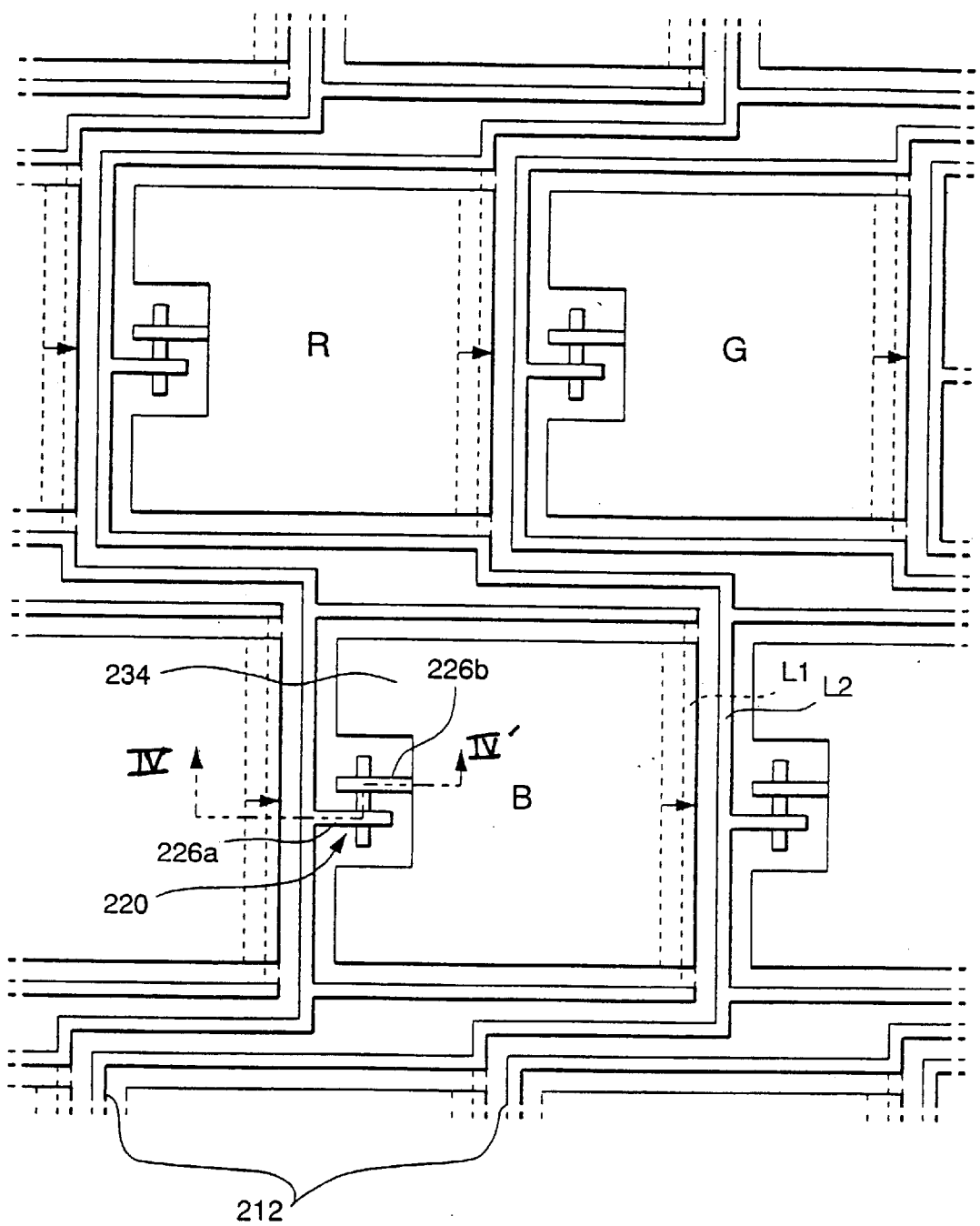
FIG. 6 is a plan view of a portion of the above wiring pattern.

This difference is described with reference to FIG. 6. FIG. 6 is a plan view of the layout of a few pixels including the TFD device 220 in the liquid crystal panel 100 of this embodiment. As shown in FIG. 6, the wiring pattern is such that line L1 opposed to the data line 212 adjacent to the pixel electrode 234 is removed from the data line 212 encircling the four sides of the pixel electrode 234. In contrast, the pixel electrode 234 is enlarged to a portion in which line L1 was present, as indicated by arrows in the drawing. Since only the data line 212 (line L2) is disposed between the pixel electrodes 234 adjacent to each other in the row direction, the possibility of short circuiting during the patterning process is reduced and the area of the pixel electrodes 234 is increased, while maintaining a spacing between the pixel electrodes 234. Therefore, the aperture ratio is improved.

With this wiring pattern, one side of the B pixel electrode 234 is opposed to the data line 212 connected to the R pixel electrode 234. The gray level in the B pixel is influenced by writing to the adjacent R pixel. Similarly, the gray level in the G pixel is influenced by writing to the adjacent B pixel, and the gray level in the R pixel is influenced by writing to the adjacent G pixel. The influence by writing is equally received by the common pixels in the row direction without any distinction between the odd rows and the even rows. For example, when writing to the R pixels for displaying cyan, the gray level in the B pixels on the odd rows and the even rows varies uniformly due to the influence of writing to the R pixels. In contrast, the G pixels on the odd rows and the even rows are influenced by writing to the B pixels. When displaying cyan, since the B pixels are not written, the gray level in the G pixels does not vary. Hence, cyan is displayed by the B pixels in which the gray level varies and by the G pixels in which the gray level does not vary. In view of the odd rows and the even rows, the gray level is not different. As a result, unevenness does not occur.

It is assumed that the three sides of the data line 212 encircling the pixel electrode 234 are substantially the same in each pixel. The reason is described hereinafter. Specifically, the three sides of the pixel electrode 234 are encircled without any relation to the odd rows and the even rows. Concerning routing of the data line 212, it is different in the odd rows and the even rows. When a portion of the three sides to be encircled is different in width, that portion may be generated depending on the odd rows and the even rows. In this case, the pixel electrodes 234 in the odd rows and the even rows have different parasitic capacitances.

According to the liquid crystal display of the second exemplary embodiment, three sides of each pixel electrode 234 are encircled by the data line 212 connected to the pixel electrode 234, whereas the remaining one side is capacitively coupled to the adjacent data line 212. The parasitic capacitances are thus made uniform with each other. According to the liquid crystal display of the second exemplary embodiment, after the short circuiting of the pattern and the degradation of the aperture ratio have been suppressed, it is possible to make a display image uniform.

Electronic Equipment

Examples of electronic equipment in which the above liquid crystal display is employed are described.

Mobile Computer

Figure 7:
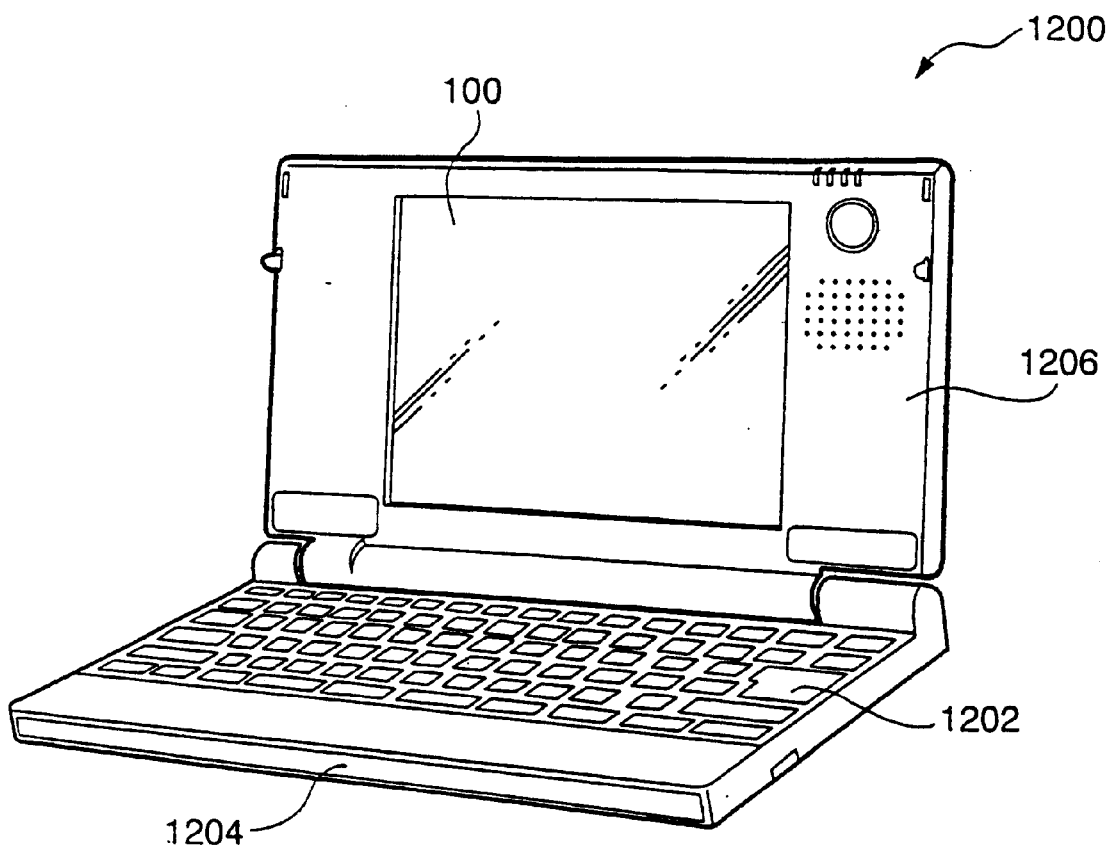
FIG. 7 is a perspective view of the structure of a personal computer as an example of an electronic equipment to which the liquid crystal display according to the above exemplary embodiments is applied.

An example of applying the liquid crystal display to a mobile computer is described. FIG. 7 is a front view of the structure of this computer. In FIG. 7, a computer 1200 includes a main body 1204 including a keyboard 1202 and a liquid crystal display 1206. The liquid crystal display 1206 is formed by the above-described liquid crystal panel 100 provided with a backlight at the back.

Pager

Figure 8:
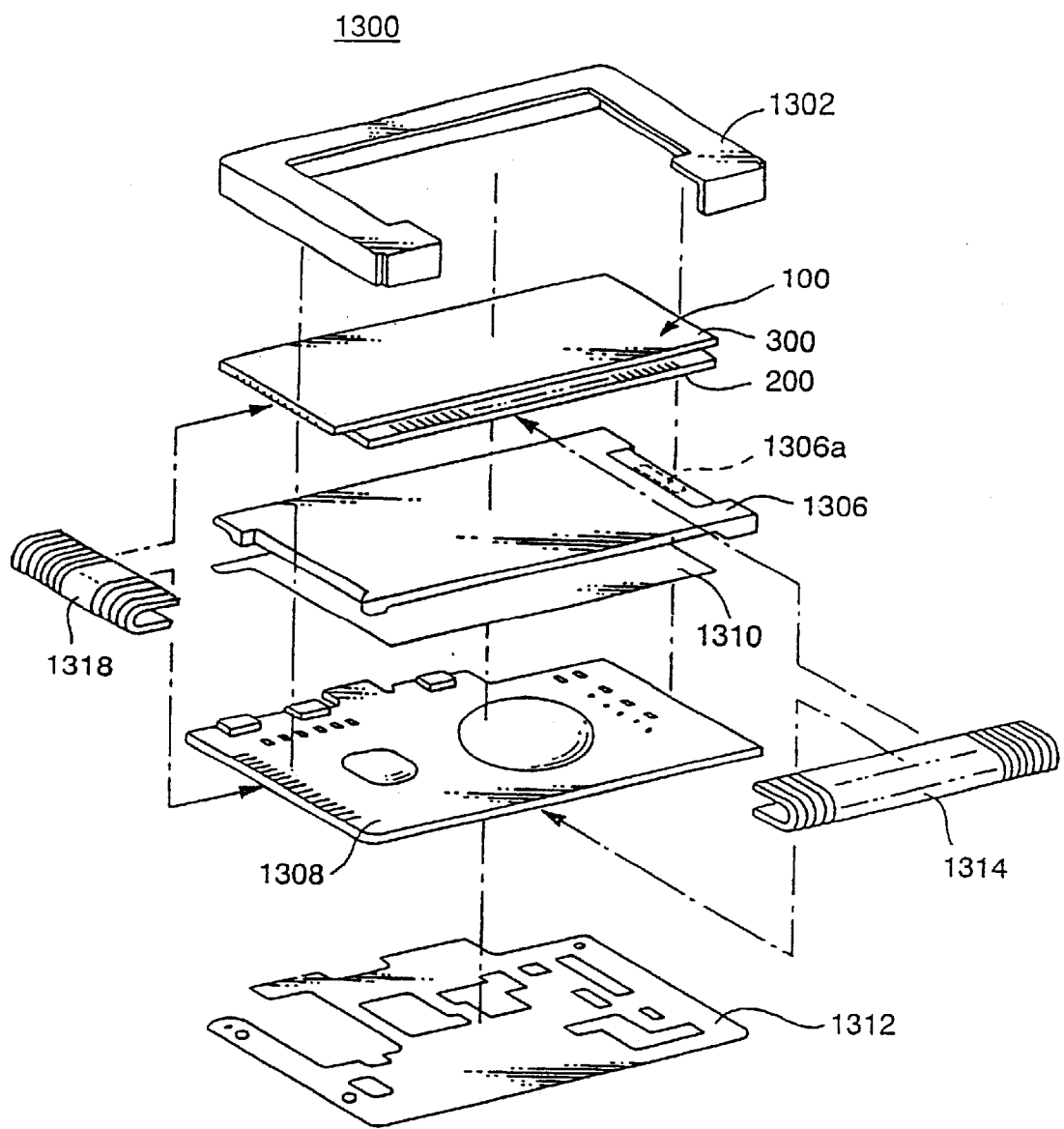
FIG. 8 is an exploded perspective view of the structure of a pager as an example of the electronic equipment to which the liquid crystal display according to the above exemplary embodiments is applied.

A pager in which the liquid crystal display is used is described. FIG. 8 is an exploded perspective view of the structure of this pager. As shown FIG. 8, a pager 1300 includes in a metal frame 1302, the liquid crystal panel 100, a light guide 1306 including a backlight 1306a, a circuit board 1308, and first and second shield plates 1310 and 1312. With this arrangement, the conduction between the liquid crystal panel 100 and the circuit board 1308 is made by a film tape 1314 for the device substrate 200 and by a film tape 1318 for the opposing substrate 300.

Cellular phone

Figure 9:
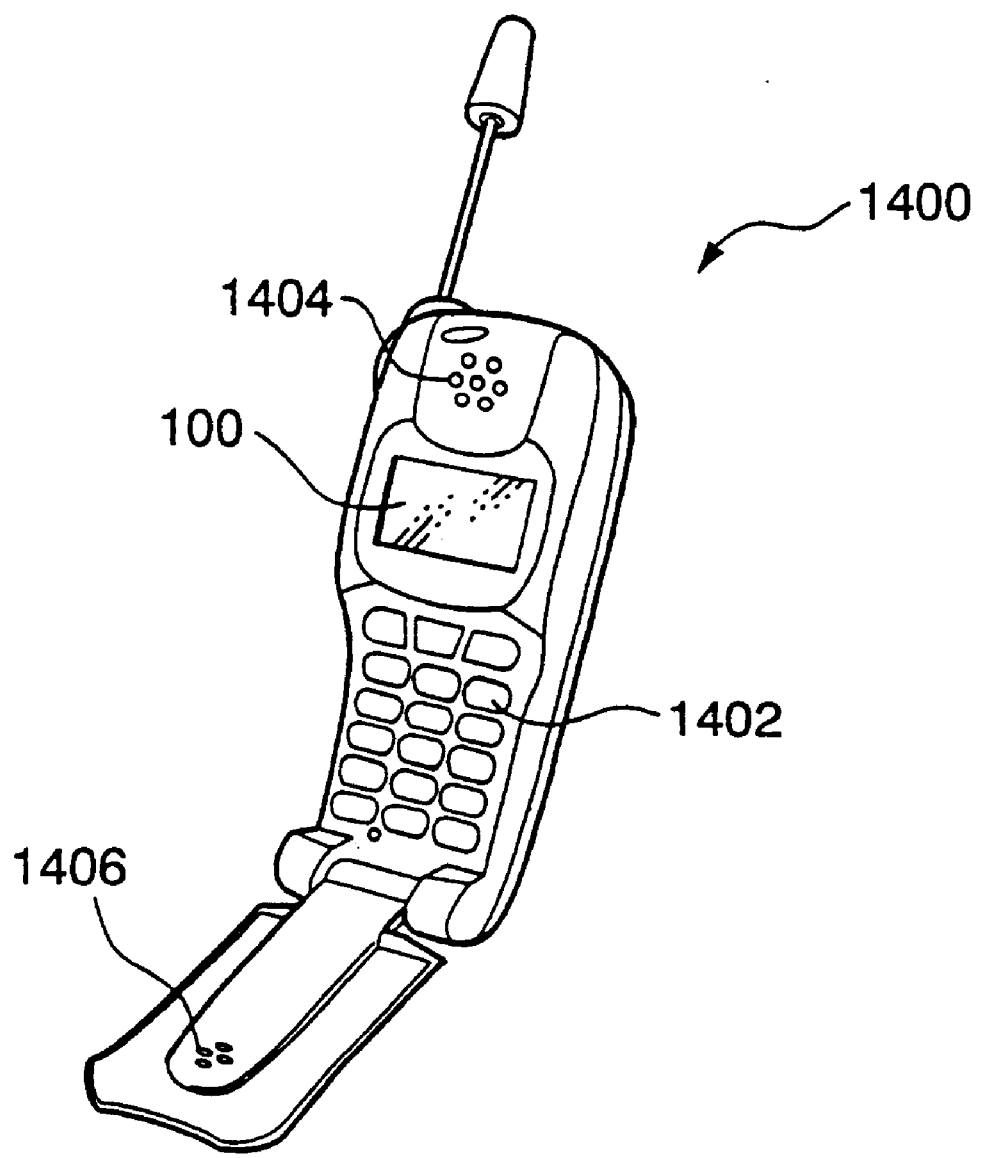
FIG. 9 is a perspective view of the structure of a cellular phone as an example of the electronic equipment to which the liquid crystal display according to the above exemplary embodiments is applied.
Figure 10A:
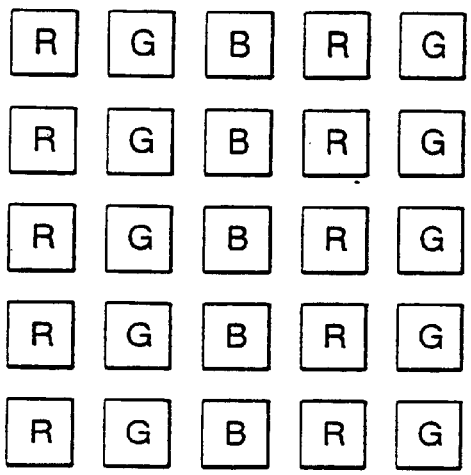
FIGS. 10(a) to (d) are illustrations of general color-filter arrangements.
Figure 10B:
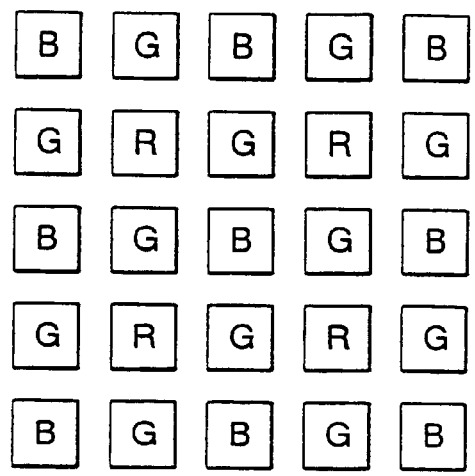
Figure 10C:
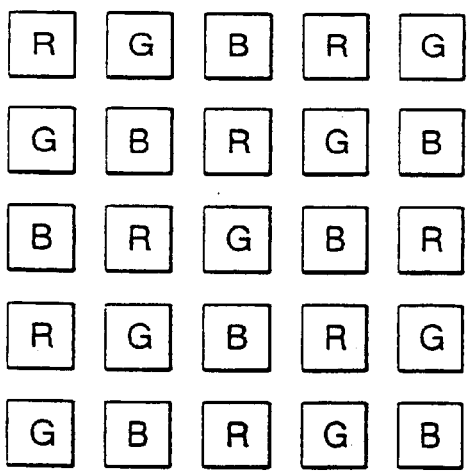
Figure 10D:
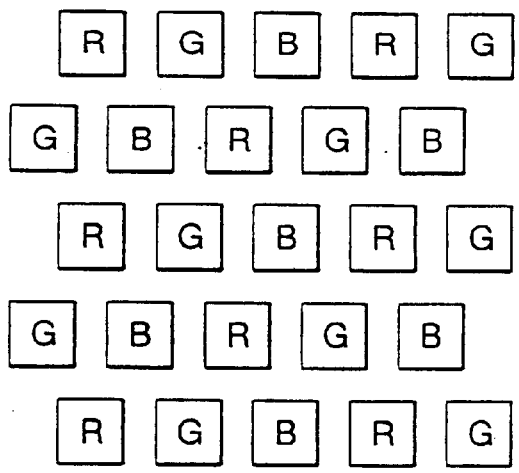

An example of applying the liquid crystal display to a cellular phone is described. FIG. 9 is a perspective view of the structure of the cellular phone. As shown in FIG. 9, a cellular phone 1400 includes a plurality of operating buttons 1402, an earpiece 1404, a mouthpiece 1406, and the liquid crystal panel 100. This liquid crystal panel 100 may be provided with a backlight at the back thereof as circumstances demand.

Concerning the electronic equipments, examples other than those described with reference to FIGS. 7 to 9 may be given. These examples include a liquid crystal television, a viewfinder-type or a direct-viewing-type video cassette recorder, a car navigation system, an electronic notebook, an electronic calculator, a word processor, a workstation, a video telephone, a POS terminal, and a device with a touch panel. It is needless to say that the liquid crystal display according to the above embodiment is applicable to these various types of electronic equipments.

Advantages

As described above, according to the present invention, unevenness due to a difference in the gray level in pixels is suppressed, thus improving the quality of a display image.

What is claimed is:

1. A wiring pattern for a liquid crystal display, comprising:

pixel electrodes corresponding to pixels displaying different colors shifted by substantially half a pitch for every row; and conduction lines shared by the pixel electrodes in a column direction, the conduction lines being connected to pixel electrodes corresponding to the same color, and a periphery of each pixel electrode, at least other than a side opposed to an adjacent conduction line, being encircled by a conduction line connected to the pixel electrode.

2. The wiring pattern according to claim 1, the side of each pixel electrode opposed to the adjacent conduction line being provided with the conduction line connected to that pixel electrode.

3. A liquid crystal display, comprising:

pixel electrodes corresponding to pixels displaying different colors provided corresponding to intersections of a plurality of scanning lines arranged in a row direction and a plurality of data lines arranged in a column direction, the pixel electrodes being shifted by substantially half a pitch for every row; and conduction lines shared by the pixel electrodes in the column direction, the conduction lines being connected to pixel electrodes corresponding to the same color, and a periphery of each pixel electrode, at least apart from a side opposed to an adjacent conduction line, being encircled by a conduction line connected to that pixel electrode.

4. The liquid crystal display according to claim 3, further comprising switching devices, the data lines being connected to the pixel electrodes through the switching devices.

5. The liquid crystal display according to claim 4, the switching devices being thin-film diode devices formed by conductor/insulator/conductor.

6. An electronic equipment, comprising:

a liquid crystal display in which pixel electrodes corresponding to pixels displaying different colors are provided corresponding to intersections of a plurality of scanning lines arranged in a row direction and a plurality of data lines arranged in a column direction, the pixel electrodes being shifted by substantially half a pitch for every row, conduction lines shared by the pixel electrodes in the column direction being connected to pixel electrodes corresponding to the same color, and a periphery of each pixel electrode, at least other than a side opposed to an adjacent conduction line, being encircled by a conduction line connected to the pixel electrode.

\* \* \* \* \*